INFINITE OPTICAL IMAGE-FORMING APPARATUS
Original Filed Feb. 23, 1966 3 Sheets-Sheet 1
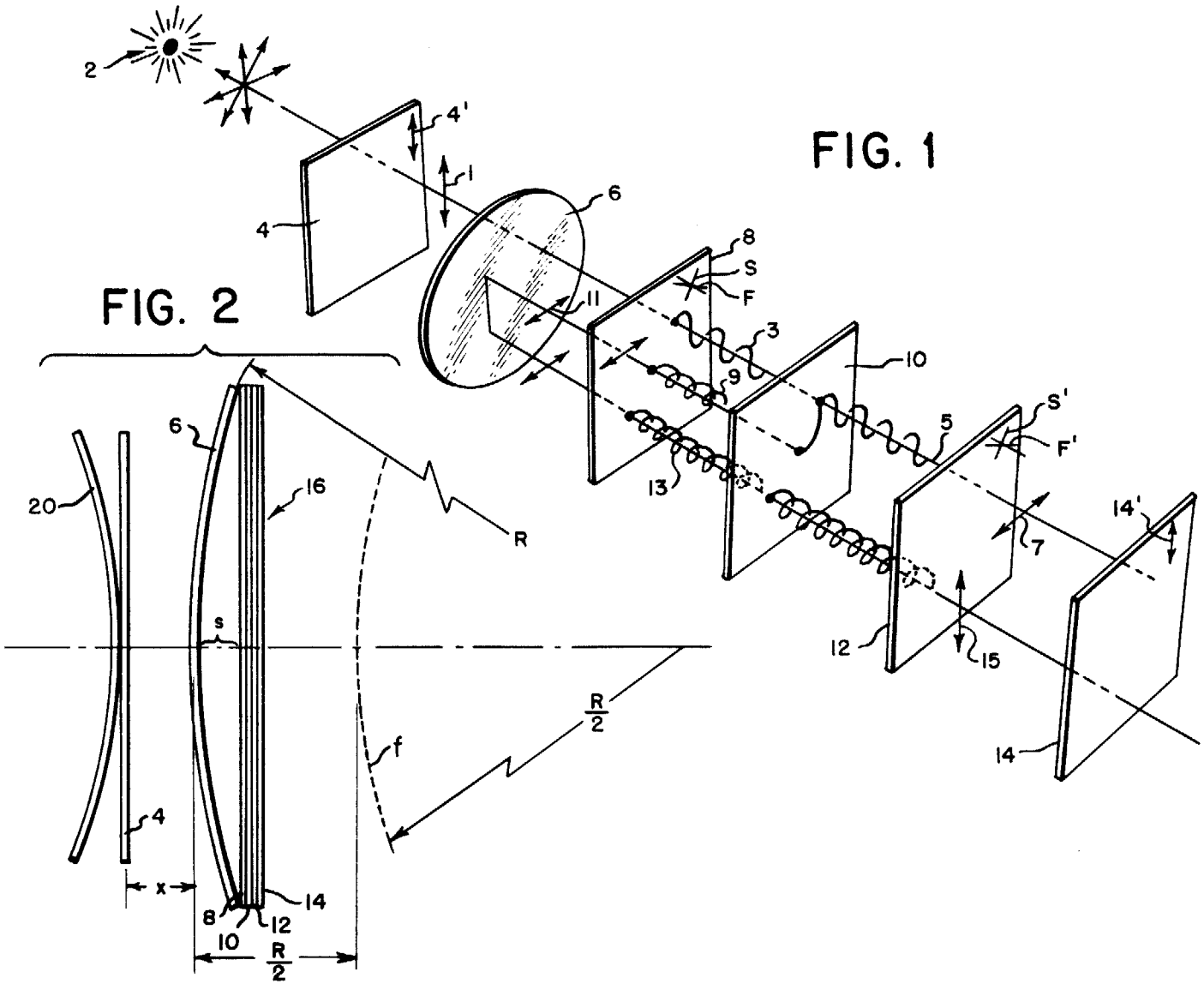
INVENTOR
Joseph La Russa
BY Pennie, Edmonds
Morton, Taylor and Adams
ATTORNEYS

INFINITE OPTICAL IMAGE-FORMING APPARATUS

Original Filed Feb. 23, 1966 3 Sheets-Sheet 2

INVENTOR.
JOSEPH LaRUSSA
BY Pennie, Edmonds,
Morton, Taylor and Adams
ATTORNEYS

INFINITE OPTICAL IMAGE-FORMING APPARATUS

Original Filed Feb. 23, 1966 3 Sheets-Sheet 3

INVENTOR.
JOSEPH LoRUSSA
BY Pennie, Edmonds,
Morton, Taylor and Adams
ATTORNEYS

United States Patent Office

Re. 27,356
Reissued May 9, 1972

27,356
INFINITE OPTICAL IMAGE-FORMING APPARATUS

Joseph La Russa, Yonkers, N.Y., assignor to Farrand Optical Co., Inc., New York, N.Y.

Original No. 3,443,858, dated May 13, 1969, Ser. No. 529,416, Feb. 23, 1966. Application for reissue Aug. 17, 1970, Ser. No. 64,517
Int. Cl. G02f *1/24*
U.S. Cl. 350—157 6 Claims

Matter enclosed in heavy brackets [ ] appears in the original patent but forms no part of this reissue specification; matter printed in italics indicates the additions made by reissue.

The present invention relates to image-forming apparatus, and more particularly to apparatus for forming, preferably at or near infinity, an image of an object or of plural objects optically superposed, the apparatus having a large exit pupil and a wide angular field of view, and being compact, light in weight and of inexpensive constriction.

The invention employs a curved mirror for image-formation since such mirrors provide in inexpensive and light-weight form image-forming elements of large aperture. As in infinity sights of the prior art, the observer or user looks effectively into the concave side of the mirror, but in contrast to these prior art devices of which I am aware, the present invention employs no oblique beam-splitting mirror across the axis of the mirror on the concave side thereof for presentation of the object to the mirror or for observation of the image formed thereby. With the apparatus of the invention therefore, the observer may place his head as close to the concave mirror as he likes. In accordance with the invention, the object to be imaged by the concave mirror is positioned behind it, i.e. on the convex side thereof, and the concave mirror is made partially transmitting and partially reflecting. A partially transmitting and partially reflecting plane mirror is disposed immediately in front of the concave mirror, i.e. on the concave side thereof, to reflect light from the object into the concave side of the concave mirror so that the latter may form an image of the object. The rays so reflected at the concave mirror pass in part through the plane beam-splitting mirror and define the image seen by the observer or observers. The plane beam-splitting mirror may lie against the concave mirror on the concave side thereof. It therefore adds nothing of significance to the length or bulk of the apparatus, and introduces no limitation on the head motions of the observer.

Further in accordance with the invention, light polarizing means are employed to block off from the observer light emanating from the object which has not undergone reflection at the concave mirror. The observer's view of the image formed by that mirror is therefore not confused by light diverging from the object itself.

The invention will now be further described by reference to the accompanying drawings in which:

FIG. 1 is a diagram useful in explaining the invention;

FIG. 2 is a cross-section of the beam-splitting mirror and polarizer combination of the invention shown together with a diffusing screen for presentation of an object to that combination;

Figure 6:
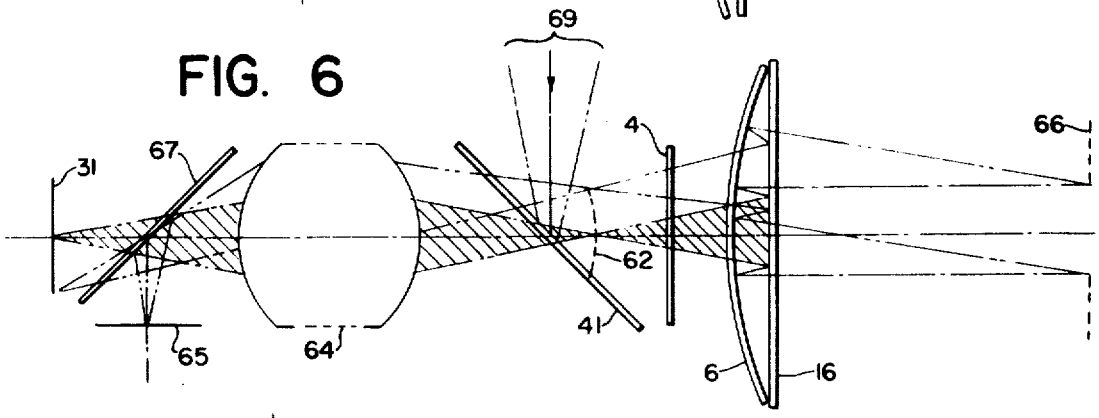
Figure 7:
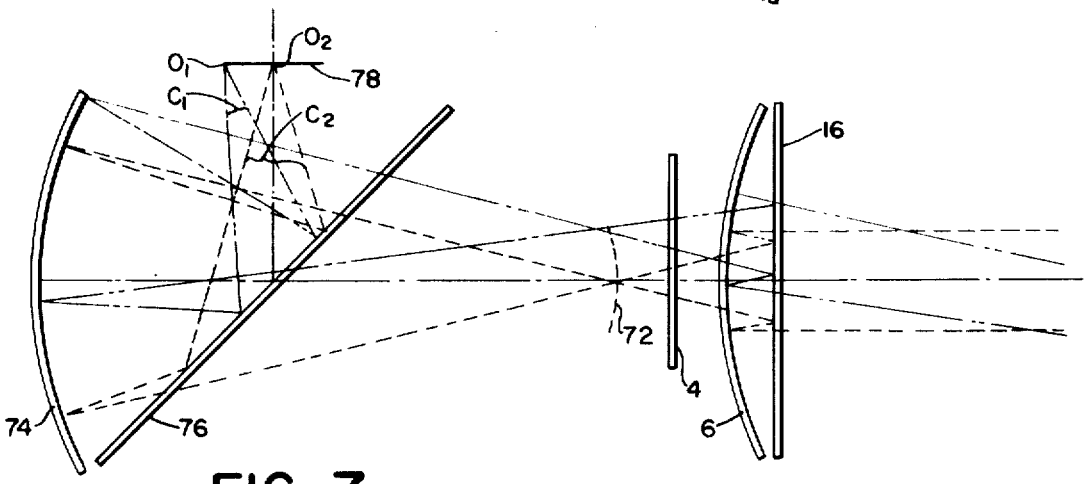

FIG. 6 is a diagram of yet another embodiment of the invention wherein however the object imaged includes a real aerial image produced in space by a projection system; and FIG. 7 is a diagram of an embodiment similar to that of FIG. 6, except that in FIG. 7 a concave spherical mirror is employed as the projection system to form the reel aerial image constituting, at least in part, the object imaged.

The invention provides apparatus forming at infinity an image of any desired object and with a desired large angular field of view, large eye relief for the observer, and large pupil so that the same image may, with suitable conveniently small dimensions for the apparatus, be simultaneously observed by two or more individuals with the naked eye. All of this is achieved without the interposition of the semi-transparent slant mirror of the customary infinity sights of the prior art. As in certain prior art systems, the image at infinity to be observed by the user is formed by means of a concave spherical mirror. In accordance with the invention the "object" so to be imaged at infinity by the concave mirror is a virtual image on or near the focal surface of the concave mirror, the light therefor passing through the concave mirror from the convex side thereof, the mirror being partially transparent. Polarization of the light is employed to insure that the observer looking into the concave mirror sees only the collimated light which makes up the image at infinity.

Figure 3:
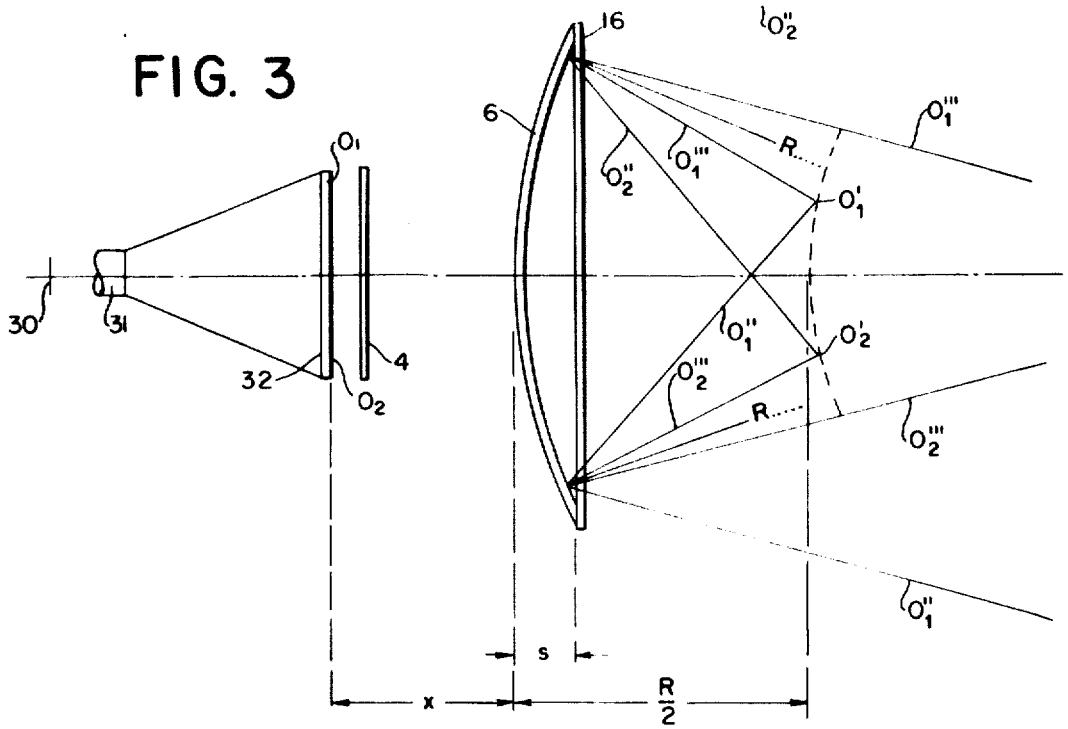
FIG. 3 is a diagrammatic representation of one embodiment of the invention wherein the object to be imaged is a diffusely radiating one, such as for example a ground glass screen illuminated by means of the image of a drawing focused on that screen by a projection lens.

Referring to FIG. 1, reference character 2 identifies a source of unpolarized light which is usually an extended source. In the embodiment of FIG. 3, the source 2 is materialized at the diffusing screen 32 whereas in the embodiment of FIG. 6, the source 2 is embodied at a real aerial image indicated by the dash line 62.

Returning to FIG. 1, a first polarizer 4 imposes linear polarization on the light from the source 2 which passes through it. The direction of polarization of polarizer 4 is identified in FIG. 1 by a vertical arrow 4', although of course any arbitrary direction may be employed. The resultant polarization of the light passing through element 4 is indicated by the vertical arrow 1. From the polarizer 4 a fraction of the linearly polarized light passes through a partially transparent curved mirror 6 convex toward the source 2. The mirror 6 will typically be spherical. Beyond the mirror 6, i.e. to the right thereof in FIG. 1, the linearly polarized light which passes through that mirror encounters a quarter wavelength plate 8. The plate 8 has its mutually perpendicular fast and slow axes F and S oriented at 45° to the plane of polarization about the direction of propagation indicated at 5. The linearly polarized light originating at the polarizer 4 which emerges from the quarter wavelength plate 8 is circularly polarized, either right or left according as the angle between the plane of polarization and the axis F is 45° or —45°. Let it be assumed that the light emerging from wavelength plate 8 is right circularly polarized, as indicated by the helical line 3. This right circularly polarized light next encounters a plane partially transmitting and partially reflecting mirror 10. The fraction of the right circularly polarized light which passes through the mirror 10 encounters a second quater wavelength plate 12 whose fast and slow axes F' and S' are [perpendicular,] *parallel*, respectively, to the corresponding axes of the plate 8. Consequently, the light emerging from the plate 12 along the direction of propagation 5 has been reduced to linearly polarized light with a plane of polarization at 90° to that of the polarizer 4. This is indicated in FIG. 1 by means of the arrow 7. This horizontally polarized light is blocked at a second plane polarizer 14 whose plane of polarization is parallel to that of the polarizer 4, as indicated at the arrow 14' therein.

The fraction of the circularly polarized light from the quarter wavelength plate 8 which is reflected at the plane beam-splitting mirror 10 is converted upon such reflection into circularly polarized light of the opposite rotation, i.e. into left [hand] circularly polarized light in the case assumed. This is indicated in FIG. 1 by means of the left-hand helix 9. In its passage backward parallel to the direction of propagation 5 but toward the source 2, this left circularly polarized light encounters again the quarter wavelength plate 8 from which it emerges as linearly polarized light with a plane of polarization at 90° to that of the light first polarized at the element 4. This is indicated in FIG. 1 by means of the horizontal arrow 11. This horizontally linearly polarized light is in part reflected at the concave beam-splitting mirror 6 without change in the orientation of its plane of polarization. The light so reflected becomes left circularly polarized on passage through the wavelength plate 8, as indicated by the left-hand helix 13. The fraction of this left circularly polarized light which gets through the beam splitter 10 is converted by the second quarter wavelength plate 12 into linearly polarized light in a vertical plane of polarization, as indicated by the vertical arrow 15. This light accordingly is permitted to pass through the second plane polarizer 14 and constitutes the only fraction of the unpolarized light from the source 2 which is visible to an observer located at the right of the elements shown in the structure of FIG. 1.

The combination of plane polarizer 4, beam-splitting curved mirror 6, quarter wavelength plate 8, beam-splitting plane mirror 10, second quarter wavelength plate 12 and second plane polarizer 14 described in conjunction with FIG. 1, is employed in the invention to permit the formation of a virtual image at or near the principal focus of the concave mirror 6. This virtual image is then imaged in turn at infinity by that curved mirror. The elements 8, 10, 12 and 14 of FIG. 1 may be assembled in a compact flat package extending negligibly, for the purposes of the observer, into the space to the right of the concave mirror 6 and leaving that space entirely free of obstructions of any kind. Neither the object ultimately to be imaged at infinity nor any oblique beam-splitting mirror is disposed in this space. The linear and angular dimensions of that object are hence not limited by considerations of spacing between the concave mirror and any such oblique beam-splitting mirror nor by the desired freedom of head movement to be preserved for the observer.

Such a package is generally indicated at 16 in FIG. 2, with the plane polarizer 14, the quarter wavelength plates 8 and 12, and the plane beam-splitting mirror 10 identified therein. Also shown in FIG. 2 are a diffusing screen 20 to serve when illuminated as the object to be imaged, corresponding to the source 2 of FIG. 1, and the first polarizer 4 and concave beam-splitting mirror 6. The screen 20 is shown convexly curved toward the other elements, as it may advantageously be in order that the virtual image thereof produced by the plane mirror 10 may coincide with the curved focal surface of the spherical mirror 6.

The combined thickness of the elements 8, 10, 12 and 14 making up the package 16 may be less than the sagitta s of the mirror 6, by which term is meant the depth thereof. The focal surface of the mirror 6 is indicated at the dashed line f, distant from the mirror 6 by one-half of its radius R. Considering, as may legitimately be done, the combined thicknesses of the elements 8, 10, 12 and 14 as negligible by reference to the distance R/2, and particularly that the mirror 10 is not significantly spaced from the edge of mirror 6 by quarter wavelength plate 8, it is clear from FIG. 2 that if the source 20 of unpolarized light is distant to the left of the vertex of the mirror 6 by a distance x such that $x+s=R/2-s$, then the object 20 will be virtually imaged by the plane mirror 8 on or close to the focal surface f so that the spherical mirror 6 will form at infinity to the right an image of the object provided by that vertical image.

This will be further explained with reference to FIG. 3, showing an embodiment of the invention wherein an object such as a transparent slide 30 is imaged by a projection lens 31 on a translucent diffusing screen 32. To the right of the screen 32 is disposed the polarizer 4, the spherical beam-splitting mirror 6, and the assembly of elements 8, 10, 12 and 14 collectively indicated at the reference character 16 with a spacing x between the screen 32 and the vertex of the mirror 6. The consequence is the formation at infinity on the right of an image of the object 30.

In FIG. 3, two points of the object constituted by the diffusely luminous screen have been identified at $O_1$ and $O_2$. Their virtual images in the plane beam-splitting mirror 10 of the unit 16 are shown at $O_1'$ and $O_2'$ at or near the focal surface of mirror 6 indicated by the dashed line f. From each of these points there has been indicated the path of two rays selected to be near the edge of the mirror 6. These are denoted $O_1''$ and $O_1'''$ for point $O_1$ and $O_2''$ and $O_2'''$ for point $O_2$. It will be seen that anywhere between rays $O_1'''$ and $O_2'''$ an observer can observe in collimated light an image of the complete object extending from $O_1$ to $O_2$.

In the embodiment of FIG. 3, the exit pupil of the system is formed at the edge of the mirror 6 itself. While the screen 32 is shown flat in FIG. 3, it may advantageously be convexly curved toward the mirror 6, as shown and explained in connection with FIG. 2. The radius of curvature of the screen 32 should be equal, as nearly as conveniently may be, to R/2, i.e. to the radius of curvature of the focal surface of mirror 6, which serves as a collimating eyepiece. By giving such curvature to screen 32, a flat field is achieved.

In the embodiment of FIG. 3, a cathode ray tube may be substituted for the projection lens 30 and screen 32, with the fluorescent screen of that tube at the position of screen 32.

Figure 4:
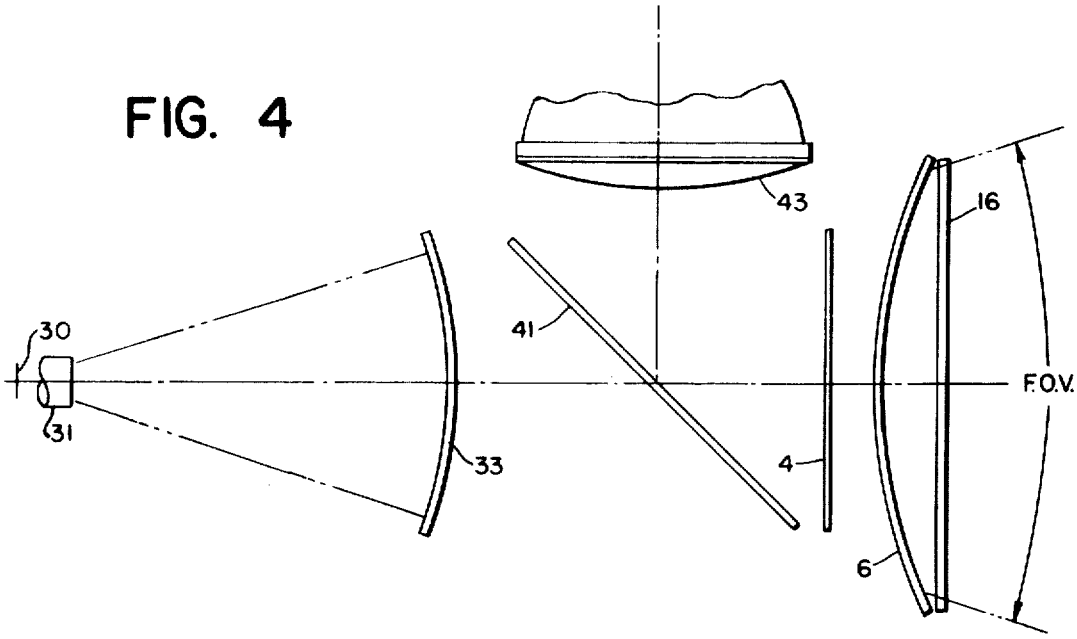
FIG. 4 is a diagram similar to that of FIG. 3 but showing another embodiment of the invention in which the object to be imaged comprises superposed images.

FIG. 4 illustrates an embodiment of the invention similar to that of FIG. 3 in which however a plane semi-transparent mirror 41 has been positioned obliquely across the optical axis of the system between the diffusing screen 33 and the first linear polarizer 4. A second object, such as the face of a television tube 43, is positioned to have an image thereof formed by the mirror 41 in superposition with the screen 33. In this way there may be presented to the viewer or viewers on the right, in FIG. 4, of the package 16, an image of two object fields in superposition. The embodiment of FIG. 4 desirably fulfills the dimensional citerion previously explained in terms of the relation $x+s=R/2-s$, according to which the spacing x of the object 33 from the vertex of the concave mirror 6, plus the depth s of that mirror, is equal or substantially equal to one-half the radius of curvature of that mirror less that depth.

Figure 5:
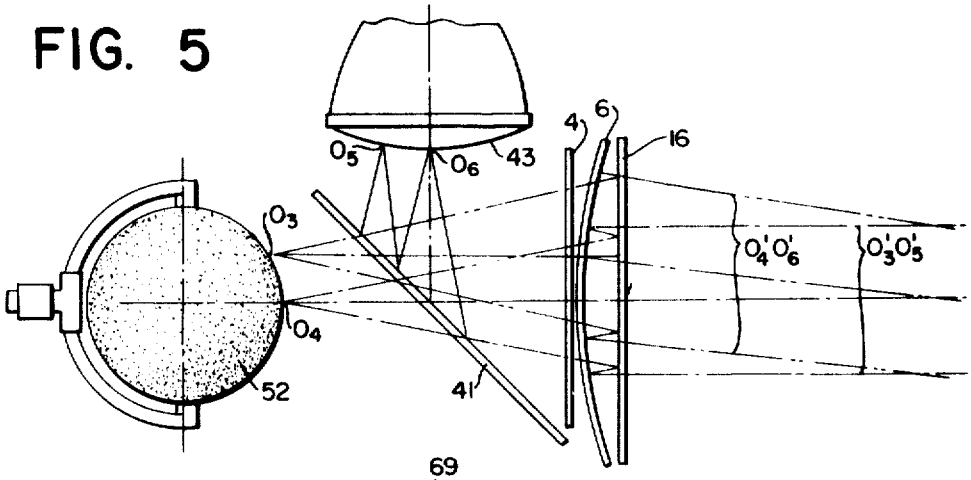
FIG. 5 is a diagram similar to that of FIG. 4 in which however one of the objects imaged is a material sphere, whose surface may simulate the celestial sphere.

FIG. 5 shows another embodiment of the invention similar to that of FIG. 4, except that in place of the transparent slide 30, projection lens 31 and diffusing screen 32 or 33 heretofore described, the embodiment of FIG. 5 employs a material sphere 52 onto which a replica of the celestial sphere may be drawn. There have, moreover, been drawn in on FIG. 5 the rays and ray bundles emanating from two points $O_3$ and $O_4$ on the sphere 52 and from the corresponding object points $O_5$ and $O_6$ on the television tube screen 43. Cones of light rays diverging from these points are seen to be reflected at the plane beam-splitting mirror in the package 16. Because in this embodiment as in that of FIG. 2 the optical distance from these object points to the plane mirror in package 16 is approximately the same as the distance from that plane mirror to the focal surface of mirror 6, these cones of light, after reflection by the plane mirror in package 16, strike the mirror 6 and are there transformed into two collimated bundles, one marked in the figure $O_3'$, $O_5'$ and the other marked $O_4'$ $O_6'$.

In the apparatus of the invention, the exit pupil may be constituted by the beam-splitting curved mirror, or there may be a true exit pupil in the nature of an image, in the image space, of the aperture stop of the system. Typically such an image, if it exists, will be located in the image space optically beyond that mirror. Positions optically beyond that mirror are those of light originating at the object or objects and which has been reflected at that mirror.

In the embodiments as thus far described, it has been the spherical beam-splitting mirror 6 itself which has been most restrictive on the angular extent of the bundles or cones of light divergent from a point in the real object (e.g., a point on the screen 32 or 33 of FIGS. 3 and 4) which can get through the optical system. Hence in these systems the spherical mirror constitutes the aperture stop. Since, in respect of rays reflected at that mirror there are no optical elements beyond it having any reflecting or refracting effect on those rays, and hence capable of forming an image of the edge of that mirror in the image space, there has been no image of the edge or rim of mirror 6 in the image space, and hence no exit pupil distinct from the edge or rim of mirror 6 itself. The embodiment of FIG. 5 is of this character notwithstanding the suggestion to the contrary given by the intersection, to the right of mirror 6, of the limiting rays shown for the collimated bundles $O_4'$ $O_6'$ and $O_3'$ $O_5'$. The suggestion is due to the fact that, in order to show the reflection from the mirror 10 in the package 16 of that figure back to the mirror 6, the limiting rays have been shown well in from the edge of the mirror 6. In actual fact, the cones diverging from points $O_3$, $O_4$, $O_5$ and $O_6$ and which get through the system have a common base defined by the edge of mirror 6, and the parallel bundles $O_4'O_6'$ and [$O_3'O_6'$] $O_3'$ $O_5'$ likewise have, in actuality, cross-sections limited by the edge of mirror 6. Hence those bundles intersect each other at the mirror 6 and not to the right thereof.

The invention may however be embodied in structures wherein a true exit pupils is formed, defining the location within which the observer or [observes] *observers* must be located if they are to see the entire object. FIG. 6 illustrates such an embodiment. In this figure, the object presented to the combination of elements comprising polarizer 4, mirror 6 and package 16 is a real aerial image formed on a surface in space indicated at 62 by means of refracting and/or reflecting optics to the left thereof, diagrammatically indicated at 64. These may be similar [to] *or* substantially identical to the projection lens shown at 31 in FIG. 4. The function of the optics 64 is to form, at the position 62, a real image, of which the apparatus of the invention schematically shown in FIG. 1 is to form an image at infinity on the right. In the embodiment of FIG. 6 the cone of rays diverging toward the right from each point in the real image at 62 is limited by some element in the system 64 and, in accordance with the usual theory of pupils, the collimated bundles corresponding to those cones all pass through a common cross-section termed the exit pupil of the system which is shown at 66 and which is defined as the image of the aperture stop produced by all elements of the system optically beyond the aperture stop in the direction of light passage from the original object 31 toward the final image at infinity on the right.

As is indicated in FIG. 6, the real aerial image at 62 may be made up of a combination of plural real aerial images. In that figure, the slide 31 constitutes a first input. A second input is provided at another slide or picture, transparent or opaque, shown at 65, of which a virtual image is superposed on the object 31 by means of a plane partially transparent mirror 67. Still another input is indicated at 69 for combining with the inputs 31 and 65 by means of the plane semi-transparent mirror or "combining glass" 41 at the location 62. A projection system, not shown, which may be like the projection system 64, may be employed to develop from a diffusely luminous real object, not shown, a real image positioned by the glass 41 at the location 62.

FIG. 7 shows still another embodiment of the invention, similar to that of FIG. 6, in that there is presented to the combination of spherical mirror 6 and package 16 as object a real aerial image 72 and further similar to FIG. 6 in that an exit pupil is formed to the right (in FIG. 7) of the package 16. In the embodiment of FIG. 7 however the objective 64 of FIG. 6 takes the form of a concave mirror 74 and associated semi-transparent plane mirror 76. The mirror 74 is operated at finite conjugates, the object position therefor being indicated at 78. Any desired single image or superposition of plural images may be formed at the position 78 by means not shown. For example, an illuminated transparent slide may be positioned at the location 78. To indicate the nature of the light passage through the system of FIG. 7, there have been shown at $O_1$ and $O_2$ two points in the object at 78, and there have been shown at $C_1$ and $C_2$ fragments of the cones of light which diverge from those points and which pass through the system.

In FIG. 1 it was assumed that the plane polarizers 4 and 14 had their planes of polarization parallel to each other, and that the quarter wavelength plates 8 and 12 were [crossed] *also parallel* with respect to each other. The invention is however not limited to this arrangement. If the plates 8 and 12 have corresponding axes [parallel,] *perpendicular*, and if instead the [polarizes] *polarizers* 4 and 14 are *also* crossed, the operation will be essentially the same.

In this case the polarizer 4 will as before impose linear polarization on the light from the source 2 and the plate 8 will as before impose circular polarization on the linearly polarized light which has passed through the polarizer 4 and the concave mirror 6, the mutually perpendicular fast and slow axes of the plate 8 being again substantially at 45° to the plane of polarization imposed by polarizer 4. The fast and slow axes of the plate 12 being now [parallel] *perpendicular* respectively to those of the plate 8, the effect of the plate 12 will be to reduce this circularly polarized light to plane polarized light having a plane of polarization shifted by 90° from the plane to which that light is reduced when the plate 12 has its axes [crossed] *parallel* with respect to the axes of plate 8. Thus, assuming the plane of polarization of the element 4 to be vertical and the corresponding axes of plates 8 and 12 to be [parallel] *perpendicular* with respect to each other, the light passing from the source 2 through the polarizer 4 and reaching the plate 12 without undergoing reflection will be restored by the plate 12 to vertical plane polarization. If however as now assumed the polarizers 4 and 14 have their axes crossed, the light so emerging from the plate 12 will be blocked at the polarizer 14.

Orientation of the second wave plate 12 with its axes [parallel] *perpendicular* respectively to those of the plate 8 is without effect on the action of the elements 10, 8 and 6 on that fraction of the circularly polarized light developed at the plate 8 which is reflected at the plane beam-splitter 10. Hence, the collimated light obtained therefrom by reflection at the concave mirror 6 and indicated at 13 has as in the case actually illustrated in FIG. 1, upon arrival at the second plate 12, a circular polarization opposite to that indicated at 3 in FIG. 1 for the light initially subjected to circular polarization by the wave plate 8. It will therefore be reduced by the plate 12 to plane polarized light polarized in a plane perpendicular to that to which the plate 12 reduces the circularly polarized light indicated at 3. That is to say, on the assumption that the plane of polarization of element 4 is vertical, the collimated light from mirror 6 will be reduced by plate 12 to horizontally polarized light. This light will therefore pass through the plane polarizer 14, now assumed to have a plane of polarization perpendicular to that of the polarizer 4.

In general therefore, it may be said that the two quarter wavelength or "quarter-wave" plates 8 and 12 should both have their mutually perpendicular fast and slow axes oriented at substantially ±45° to the plane of polarization of each of the plane polarizers, that the two quarter-wave plates should have their corresponding axes (e.g. their fast axes) oriented to each other at an angle which is a first substantially integral multiple of 90°, and that the two plane polarizers should have their planes of polarization oriented to each other at an angle which is a second substantially integral multiple of 90°, [one] *both* of these multiples being even [and the other] *or both being odd.* Thus, if the first multiple is even, having the value zero, the quarter-wave plates will have their corresponding axes parallel, and the second multiple will [be odd,] *also be even,* having the value [one,] *zero,* so that the plane polarizers will be [crossed.] *parallel.* If the first multiple is odd, i.e. of value one, the quarter-wave plates will be crossed and the second multiple will be [even,] *odd,* i.e. of value [zero,] *one,* making the plane polarizers [parallel. This is the] *perpendicular. The first* case *is* actually illustrated in FIG. 1.

It is not necessary to consider even multiples other than zero or odd multiples other than one.

The plane polarizers 4 and 14 and the quarter-wave plates 8 and 12 may all be of the flat sheet type, now well-known. These devices are described, for example, in the article on polarized light in vol. 10 of McGraw-Hill "Encyclopedia of Science and Technology," 1960, pages 448 to 454.

The invention is of course not limited to the use of spherical mirrors. Other forms of curved mirror may be employed. With such other curved mirrors, as with the spherical mirrors which have been discussed, the object of which the system of the invention is to form an image at or near infinity (i.e. the elements 20, 32, 33, 43 and 52 in FIGS. 2, 3, 4 and 5, or the real aerial image 62 or 72 of FIGS. 6 and 7) should be disposed at such a distance from the beam-splitting mirror 10 that the virtual image of that object formed by that plane mirror will be at or near the focal surface of the curved mirror.

While in FIG. 2 the first polarizer has been shown distant from the vertex of the mirror 6 by the distance $x=R/2-2s$, it may of course be closer to the mirror 6 and, at least in embodiments of the invention making use of a real aerial image such as that of FIG. 6, it may be farther from the mirror 6 than that distance x. In its simplest form therefore the invention need include no more than the curved mirror 6, the first quarter-wave plate 8, the plane beam-splitting mirror 10, the second quarter-wave plate 12, and the plane polarizer 14. More generally, while the invention has been described hereinabove in terms of a number of exemplary presently preferred embodiments, it is not limited thereto. Rather it comprehends all modifications on and departures from these embodiments falling within the spirit and scope of the appended claims.

I claim:

1. Image-forming apparatus comprising a beam-splitting curved mirror, a first quarter-wave plate disposed on the concave side of the curved mirror, a second beam-splitting mirror disposed on the side of the first quarter-wave plate remote from the curved mirror, a second quarter-wave plate disposed on the side of the second beam-splitting mirror remote from the first quarter-wave plate, and a polarizer disposed on the side of the second quarter-wave plate remote from the second beam-splitting mirror, the first and second quarter-wave plates having their fast axes oriented with respect to each other at a substantially integral multiple of 90° and the polarizer having its plane of polarization oriented substantially at an odd integral multiple of 45° to the fast axis of the second quarter-wave plate.

2. Image-forming apparatus according to claim 1 wherein the quarter-wave plates, second beam-splitting mirror and polarizer are constituted of flat sheets assembled together in a package.

3. Image-forming apparatus according to claim 1 including means to form a real aerial image at a position whose virtual image in the second beam-splitting mirror is adjacent the focal surface of the curved mirror.

4. Image-forming apparatus comprising a first polarizer, a beam-splitting curved mirror convex toward the first polarizer, a first quarter-wave plate on the concave side of the curved mirror and having its fast and slow axes disposed at substantially 45° to the plane of polarization of said first polarizer, a second beam-splitting mirror on the side of the first quarter-wave plate remote from the curved mirror, a second quarter-wave plate on the side of the second beam-splitting mirror remote from the first quarter-wave plate, said second quarter-wave plate having its fast and slow axes oriented with respect to the corresponding axes of the first quarter-wave plate at angles equal to a first substantially integral multiple of 90°, and a second polarizer on the side of the second quarter-wave plate remote from the second beam-splitting mirror, the second polarizer having its plane of polarization oriented to the plane of polarization of the first polarizer at an angle equal to a second substantially integral multiple of 90°, [one] *both* of said multiples being even [and the other] *or both* being odd.

5. Image-forming apparatus according to claim 4 including a diffusing screen disposed on the side of the first polarized remote from the curved mirror and at a distance from the second beam-splitting mirror such that the vitual image of the screen in the second beam-splitting mirror is adjacent the focal surface of the curved mirror.

6. Image-forming apparatus according to claim 5 wherein the curved mirror is a spherical mirror, wherein the quater-wave plates, second beam-splitting mirror and *second* polarizer are constituted of flat sheets and wherein the diffusing screen is distant from the vertex of the curved mirror by substantially one-half the radius of curvature of the curved mirror diminished by twice the distance from the vertex of the curved mirror to the second beam-splitting mirror.

References Cited

The following references, cited by the Examiner, are of record in the patented file of this patent or the original patent.

D. A. Dery, "Controlling Light Behavior Through Linear, Circular, and Spectrally-Selective Polarizers" Manufacturing Opticion, vol. 17, No. 6 (March 1964), pp. 268–270.

DAVID SCHONBERG, Primary Examiner

P. R. MILLER, Assistant Examiner

U.S. Cl. X.R.

350—27, 147, 152, 293

PO-1050
(5/69)

UNITED STATES PATENT OFFICE
CERTIFICATE OF CORRECTION

Patent No. Reissue 27,356 Dated May 9, 1972

Inventor(s) Joseph La Russa

It is certified that error appears in the above-identified patent and that said Letters Patent are hereby corrected as shown below:

Column 1, line 21, for "constriction" substitute --construction--.
Column 2, line 64, for "quater" substitute --quarter--.
Column 7, line 17, for "odd" substitute --odd--.
Column 8, line 40, for "polarized" substitute --polarizer--;
line 42, for "vitual" substitute --virtual--.

Signed and sealed this 2nd day of January 1973.

(SEAL)
Attest:

EDWARD M.FLETCHER,JR.
Attesting Officer

ROBERT GOTTSCHALK
Commissioner of Patents